United States Patent
Wang et al.

(10) Patent No.: US 9,353,888 B2
(45) Date of Patent: May 31, 2016

(54) POLYMER BAG GROUTING METHOD FOR REPAIRING SETTLEMENT OF UNDERGROUND PIPELINES

(71) Applicant: SAFEKEY Engineering Technology(Zhengzhou), Ltd., Zhengzhou, Henan (CN)

(72) Inventors: Fuming Wang, Henan (CN); Yanhui Zhong, Henan (CN); Mingsheng Shi, Henan (CN); Hongyuan Fang, Henan (CN); Xiaoliang Wang, Henan (CN)

(73) Assignee: SAFEKEY Engineering Technology (Zhengzhou), Ltd, Zhengzhou, Henan (CN)

( * ) Notice: Subject to any disclaimer, the term of this patent is extended or adjusted under 35 U.S.C. 154(b) by 0 days.

(21) Appl. No.: 14/969,474

(22) Filed: Dec. 15, 2015

(65) Prior Publication Data

US 2016/0102782 A1    Apr. 14, 2016

(30) Foreign Application Priority Data

Feb. 9, 2015    (CN) .......................... 2015 1 0069861

(51) Int. Cl.

| F16L 55/175 | (2006.01) |
|---|---|
| F16L 55/18 | (2006.01) |
| F16L 1/10 | (2006.01) |
| F16L 3/00 | (2006.01) |
| F16L 1/036 | (2006.01) |

(52) U.S. Cl.
CPC . *F16L 1/10* (2013.01); *F16L 1/036* (2013.01); *F16L 3/00* (2013.01); *F16L 55/175* (2013.01); *F16L 55/18* (2013.01)

(58) Field of Classification Search
CPC .................................. F16L 55/175; F16L 1/10
USPC ................................ 405/184.1, 184.4; 138/97
See application file for complete search history.

(56) References Cited

U.S. PATENT DOCUMENTS

| 2,917,085 A * | 12/1959 | Douse ...................... E03F 3/06 138/97 |
|---|---|---|
| 3,718,978 A * | 3/1973 | Van Koevering ........ B62D 1/26 104/138.2 |
| 4,309,128 A * | 1/1982 | Williams .................. E03F 3/06 138/97 |
| 4,657,436 A * | 4/1987 | Yarnell ..................... E03F 3/06 138/97 |
| 4,921,374 A * | 5/1990 | Stutzman ............... F16L 55/175 138/99 |
| 7,371,031 B1 * | 5/2008 | Grimmett ................. E03F 3/06 138/97 |
| 2004/0156682 A1 * | 8/2004 | Blackmore ............... E03F 3/06 405/184.1 |
| 2007/0258773 A1 * | 11/2007 | Bennett ............... F16L 55/1645 405/184.1 |
| 2014/0348591 A1 * | 11/2014 | Hamman ................ F16L 1/028 405/184.3 |
| 2015/0132064 A1 * | 5/2015 | Pirtle ..................... F16L 1/028 405/184.1 |

* cited by examiner

*Primary Examiner* — Frederick L Lagman

(57) ABSTRACT

A polymer bag grouting method for repairing a settlement of an underground pipeline includes steps of: (1) detecting a settled pipeline section and determining a grouting plan; (2) drilling holes for containing bags; (3) placing the bags into the holes; (4) injecting a polymer material into the bags; (5) uplifting the settled pipeline section; and, (6) filling a cavity and reinforcing a soft soil layer. The polymer material is a non-water reacted two-component polymer material. The method provided by the present invention has advantages of rapidness, small cut, light mass, high tenacity, economy and durability. The method is advanced, highly-efficient, economical and practical and able to rapidly repair the settlement of the pipeline section through uplifting. The method of the present invention is successfully applied to multiple projects of uplifting the underground pipelines, showing great economic and social benefits and a wide development and application prospect.

6 Claims, 3 Drawing Sheets

POLYMER BAG GROUTING METHOD FOR REPAIRING SETTLEMENT OF UNDERGROUND PIPELINES

CROSS REFERENCE OF RELATED APPLICATION

The present invention claims priority under 35 U.S.C. 119 (a-d) to CN 201510069861.X, filed Feb. 9, 2015.

BACKGROUND OF THE PRESENT INVENTION

1. Field of Invention

The present invention relates to an underground pipeline repairing technology, and more particularly to a trenchless polymer grouting method for repairing a pipeline settlement by uplifting, wherein the pipeline settlement is caused by bad geological environments, such as soft soil layer.

2. Description of Related Arts

The underground pipeline belongs to the concealed engineering. Because of the complex and variable geological conditions in China, the construction of the underground pipeline always meets bad geological environments, such as the soft soil layer. With an improper treatment, the constructed underground pipeline is liable to settle, causing the misalignment and the leakage at the joints of the pipeline sections. Under the ground water pressure, the surrounding soil enters the pipeline through the gap, which leads to a clogging of the underground pipeline, affects the use of the pipeline and causes the inconvenience in the resident's lives. More seriously, the soil surrounding the leakage point continuously enters the sewage pipeline, causing a cavity outside the sewage pipeline. With time going by, the ground surface would crack and collapse, leading to the traffic jam and personnel casualties, and seriously threatening the safety of the buildings nearby. Thus, it is important to repair the settlement of the underground pipeline, so as to guarantee the normal lives and the life and property safety of the residents along the pipeline.

The conventional underground pipeline repairing is divided into the trench repairing with the pipeline replacement and the trenchless repairing. The trench repairing includes steps of: trenching the soil layer above the damaged pipeline; and, partially repairing the damaged pipeline or replacing the damaged pipeline with an intact pipeline. The trench repairing is able to effectively solve the settlement of the pipeline section. However, the trench repairing has a high construction cost and a long construction period; the trench repairing seriously disturbs the lives of the residents and the traffic in the construction area. Because of the crowded underground infrastructures, the ground greening areas, the building groups and the busy traffic in the city, only small space is left for the trench construction, so that it is almost impossible to repair and replace the damaged underground pipeline by the trench repairing. The trenchless repairing mainly includes the in-suit immobilization method, the insertion method, the pipe bursting method, the folded lining method and the spraying method. The in-situ immobilization method includes steps of: turning over an end of a flexible pipe which is soaked with resin; fixing the end of the flexible pipe at an inlet of the pipeline to be repaired; turning an inner surface of the flexible pipe which is soaked with the resin outward under a water pressure or an air pressure, in such a manner that the inner surface of the flexible pipe clings to an inner surface of the pipeline to be repaired; solidifying the resin to form an antiseptic and impermeable hard lining which clings to the inner surface of the pipeline to be repaired. The in-situ immobilization method has disadvantages of requiring special construction equipments and having a high requirement to the skill levels and experience of the workers. The insertion method includes steps of: dragging an intact pipeline directly into an old pipeline; and, grouting an annular gap between the old pipeline and the intact pipeline, so as to strengthen the connection between the old pipeline and the intact pipeline. The insertion method has disadvantages of highly decreasing a flow area of the old pipeline and requiring grouting after the construction is finished. The pipe bursting method includes steps of: crushing an old pipeline by a steel conical head at a front end of a pipe bursting device with a pneumatic hammer or a tractor; and moving with the conical head by a liner plastic pipe, so as to replace the old pipeline with the liner plastic pipe. The pipe bursting method needs to trench the ground to visually connect the liner plastic pipe. If the old pipeline has a serious misalignment, the liner plastic pipe for replacing would also have a serious misalignment. Moreover, the pipe bursting method needs to trench a starting working pit and a receiving working pit. The folded lining method adopts polyethylene (PE) or polyvinyl chloride (PVC) as a material of a pipeline, including steps of: changing a geometrical shape of the pipeline in a factory or at a construction site to decrease a cross-sectional area of the pipeline; pulling the pipeline having the cross-sectional area decreased into an old pipeline; and heating or pressurizing to recover an original size and an original shape of the pipeline, in such a manner that the pipeline, as a liner pipe, closely clings to the old pipeline. The folded lining method has a disadvantage of a potential structural damage to the pipeline during the construction, such as breaking and direction deviation. The spraying method is to spray cement mortar or an organic chemical grouting material onto an inner surface of an old pipeline to form a layer of film, so as to repair the old pipeline. The spraying method has disadvantages of a high requirement to the cleaning and the leakage stoppage of the pipeline, a long repairing time, a limited repairing, being time-consuming and manpower consuming and an unstable quality.

The above methods are able to solve the structural disease and the leakage of the underground pipeline to a certain degree. However, the above methods have more or less disadvantages of the high cost, the long construction period, the great difficulty in the construction, the uncontrollable construction quality and the necessity of the working pit during the construction. Moreover, the above methods are all unable to uplift and repair the settled pipeline section and reinforce the soft foundation. A secondary settlement may still happen to the repaired pipeline section, causing a secondary misalignment at the joints of the pipeline sections and accordingly the leakage and sand gushing. Because the conventional methods are unable to radically solve the problems of the gap and the leakage between the misaligned pipeline sections, due to the settlement of the underground pipeline, it is urgent to develop an underground pipeline settlement repairing technology which has a fast construction, a low impact on the environment and a low cost, and is practical and reliable.

The polymer grouting technology is a rapid foundation reinforcement technology developed in the 1970s. The polymer grouting technology injects a two-component polymer material to the foundation and makes use of the characteristic of the two-component polymer material that the material rapidly expands and solidifies after reacting, so as to reinforce the foundation, and fill the cavities or uplift the ground. The polymer materials have a light mass, a quick reaction, a good durability and good anti-seepage performance. Conventionally, the polymer grouting technology is mainly applied to the anti-seepage, reinforcement and repairing engineering of the large infrastructures, such as the roads, the tunnels and the dams. In order to satisfy the development requirements of the maintenance engineering and overcome the disadvantages of the conventional maintenance technology of the underground pipelines in China, the present invention combines the polymer bag grouting technology with the polymer pipe grouting technology, and provides a polymer bag grouting method for repairing the settlement of the underground pipeline, which is still not reported in China.

SUMMARY OF THE PRESENT INVENTION

Accordingly, in order to solve a settlement of an underground pipeline, caused by bad geological environments, such as soft soil layer, the present invention provides a polymer bag grouting method for repairing the settlement of the underground pipelines, which is an advanced, highly-efficient, economical and practical technical measure for repairing the settlement of the underground pipeline through uplifting.

The technical solutions of the present invention are described as follows.

Firstly, a drilling device drills a plurality of holes at a regular interval along a radial direction of a settled pipeline section. Then, bags are placed into the holes, and a polymer material is injected into the bags. The polymer material rapidly expands in the bags after a chemical reaction, thereby generating an expansive force to uplift and repair the settled pipeline section. Then, a non-polymer material is injected into soil below the pipeline. The non-polymer material reacts and rapidly expands, thereby filling a cavity caused by uplifting the settled pipeline section and reinforcing a soft soil layer.

A polymer bag grouting method for repairing a settlement of an underground pipeline comprises steps of:

(1) determining a settlement location and a settlement value of the underground pipeline, wherein the underground pipeline is completely detected with a ground penetrating radar or a closed circuit television (CCTV) to determine a location of a settled pipeline section and a settlement value of the settled pipeline section;

(2) drilling a plurality of holes for containing bags, wherein the holes are drilled on the settled pipeline section which needs to be uplifted at a regular interval of 0.3-0.4 m along a radial direction of a settling end of the settled pipeline section; and each of the holes has a diameter of about 5-12 cm and a depth of about 20-40 cm;

(3) placing the bags into the holes, comprising steps of: placing first grouting pipes respectively at an opening of each of the bags; fixing the opening of each bag on the respective first grouting pipe by a circular hoop, wherein a length of the bag is larger than the depth of the hole, and the bag has the length of 30-60 cm and a diameter of 10-40 cm; and placing each of the bags which is tied up into each of the holes;

(4) injecting a polymer material into the bags, wherein the polymer material which is a two-component expansive polymer material is successively injected into each of the bags by the respective first grouting pipes;

(5) uplifting the settled pipeline section, wherein the polymer material rapidly expands and solidifies in the bags, so as to generate a huge expansive force to uplift the settled pipeline section;

(6) drilling a plurality of grouting holes, comprising steps of: drilling the plurality of the grouting holes at middle positions between each two holes, wherein each grouting hole has a diameter of 1.6 cm and is so deep as to penetrate a wall of the settled pipeline section; and inserting second grouting pipes respectively into the grouting holes; and (7) filling a cavity and reinforcing a soft soil layer, comprising steps of: injecting the polymer material into the cavity outside the pipeline, by the second grouting pipes; rapidly expanding and solidifying after reacting, by the polymer material, so as to fill the cavity caused by uplifting the settled pipeline section and effectively reinforce the soft soil layer surrounding the settled pipeline section.

The polymer material is a non-water reacted two-component polymer material.

The polymer bag grouting method for repairing the settlement of the underground pipelines, provided by the present invention, is applied to repair the settlement of the underground pipeline caused by the bad geological environments, such as the soft soil layer, and reinforce the soft soil layer. Compared with the conventional pipeline maintenance technologies, the polymer bag grouting method for repairing the settlement of the underground pipelines of the present invention has following advantages of:

(1) a good uplifting effect, wherein the non-water reacted two-component polymer material rapidly expands in the bags after the chemical reaction, so as to uplift and repair the settled pipeline section, and to reinforce the soft soil layer surrounding the settled pipeline section; and accordingly, a secondary settlement after repairing is avoided and diseases of the settlement of the underground pipeline are treated radically;

(2) a low construction cost, wherein, compared with the conventional pipeline maintenance technologies, the method provided by the present invention is able to save at least 60% of the construction cost;

(3) no influence on surrounding environments, wherein, when processing the settled pipeline section with the trenchless repairing through the method provided by the present invention, it is unnecessary to move the surrounding infrastructures and the infrastructures above the pipelines, such as optical cables and gas pipelines, which avoids disturbance and influence on the surrounding environments;

(4) a fast construction and a fast solidification of the polymer material, wherein the drilling, the grouting and the uplifting are in a continuous operation; the construction is fast; and, without waiting for solidifying, the polymer material is able to reach a 90% strength after reacting for 15 minutes, saving at least 70% of a construction period;

(5) a convenient construction, wherein serialization devices for grouting the polymer material are suitable for different sites and conveniently carried into the construction sites; and (6) a good durability, wherein the polymer material for grouting has a stable performance and a good resistance against corrosion of chemical solvents when buried underground for a long time.

Thus, the trenchless polymer composite grouting method for repairing the settlement of the underground pipeline through uplifting, provided by the present invention, has significant novelty in technical principles and construction measures. The method provided by the present invention has the advantages of the fast construction, the goof uplifting effect, the low cost and no disturbance to the ground facilities. The method is successfully applied to multiple projects of uplifting the underground pipelines, showing great economic and social benefits and a wide development and application prospect.

These and other objectives, features, and advantages of the present invention will become apparent from the following detailed description, the accompanying drawings, and the appended claims.

DETAILED DESCRIPTION OF THE PREFERRED EMBODIMENT

Combined with the accompanying drawings, further description of the present invention is illustrated as follows.

Figure 1:
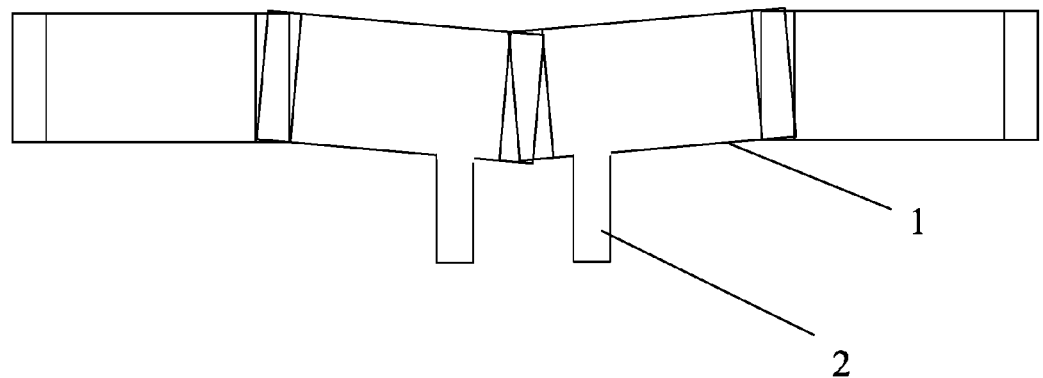
FIG. 1 is a longitudinal sectional view of holes for containing bags according to a preferred embodiment of the present invention.
Figure 2:
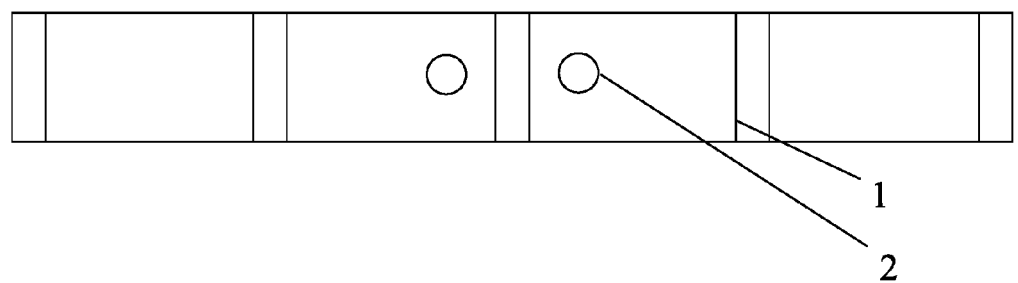
FIG. 2 is a sketch view of a planar arrangement of the holes according to the preferred embodiment of the present invention.
Figure 3:
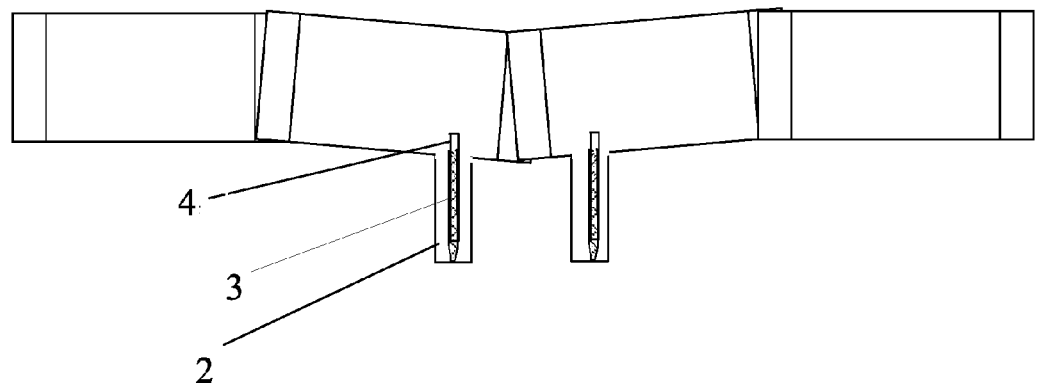
FIG. 3 is a sketch view of a placement of the bags according to the preferred embodiment of the present invention.
Figure 4:
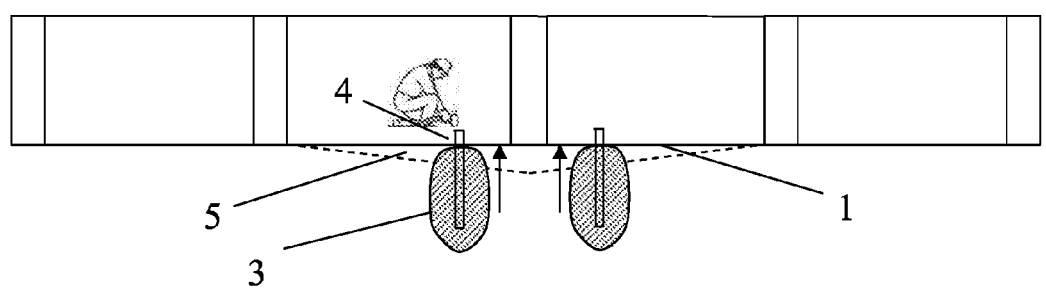
FIG. 4 is a sketch view of uplifting a settled pipeline section according to the preferred embodiment of the present invention.
Figure 5:
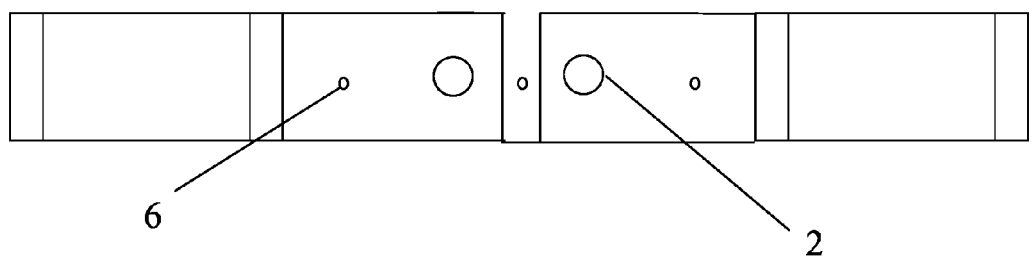
FIG. 5 is a sketch view of a planar arrangement of second grouting pipes for filling a cavity according to the preferred embodiment of the present invention.
Figure 6:
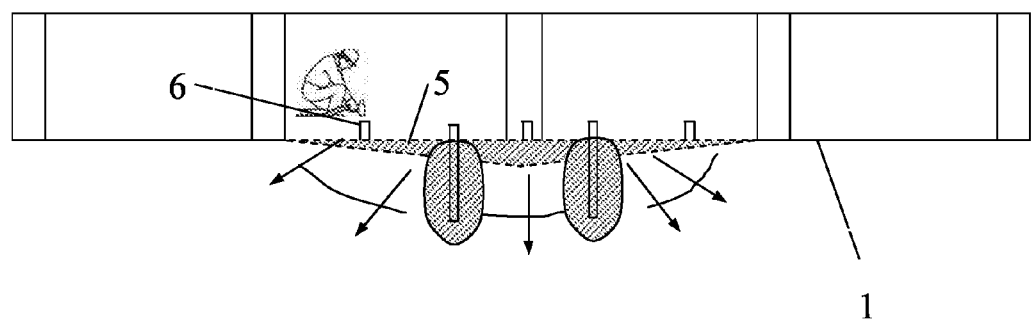
FIG. 6 is a sketch view of grouting with polymers, for filling the cavity and reinforcing a soft soil layer, according to the preferred embodiment of the present invention.

According to a preferred embodiment of the present invention, a polymer bag grouting method for repairing a settlement of an underground pipeline comprises steps of:

(1) completely detecting the underground pipeline with a closed circuit television (CCTV), and determining a location of a settled pipeline section 1 and a settlement value of the settled pipeline section 1;

(2) drilling a plurality of holes 2 for containing bags 3, wherein the holes 2 are drilled on the settled pipeline section 1 which needs to be uplifted, as showed in FIG. 1 and FIG. 2, at a regular interval of 0.3-0.4 m along a radial direction of a settling end of the settled pipeline section 1; and, each of the holes 2 has a diameter of about 5-12 cm and a depth of about 20-40 cm;

(3) placing the bags 3 into the holes 2, comprising steps of: placing first grouting pipes 4 respectively at an opening of each of the bags 3; fixing the opening of each bag 3 on the respective first grouting pipe 4 by a circular hoop, wherein a length pf the bag 3 is larger than the depth of the hole 2, and the bag has a length of 30-60 cm and a diameter of 10-40 cm; and placing each of the bags 3 which is tied up into each of the holes 2, as showed in FIG. 3;

(4) injecting a polymer material into the bags 3, wherein the polymer material which is a two-component expansive polymer material is successively injected into each of the bags 3 by the respective first grouting pipes 4, as showed in FIG. 4;

(5) uplifting the settled pipeline section 1, wherein the polymer material rapidly expands and solidifies in the bags 3, so as to generate a huge expansive force to uplift the settled pipeline section 1; and accordingly a cavity 5 is formed, caused by uplifting the settled pipeline section 1, as showed in FIG. 4;

(6) drilling a plurality of grouting holes, comprising steps of: drilling the plurality of the grouting holes at two sides of each of the holes 2, wherein each grouting hole has a diameter of 1.6 cm and is so deep as to penetrate a wall of the settled pipeline section 1; and inserting second grouting pipes 6 respectively into the grouting holes, as showed in FIGS. 5; and (7) filling the cavity 5 and reinforcing a soft soil layer, comprising steps of: injecting the polymer material into the cavity 5 by the second grouting pipes 6; rapidly expanding and solidifying after reacting, by the polymer material, so as to fill the cavity 5 caused by uplifting the settled pipeline section 1 and reinforce the soft soil layer surrounding the settled pipeline section 1.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A polymer bag grouting method for repairing a settlement of an underground pipeline, wherein in order to repair the settlement of the underground pipeline, a settled pipeline section is uplifted, and a polymer material is injected into soil below the pipeline to fill a cavity caused by uplifting the settled pipeline section and to reinforce a soft soil layer surrounding the settled pipeline section; the polymer bag grouting method comprises steps of:

(1) completely detecting the underground pipeline with a ground penetrating radar or a closed circuit television, and determining a location of the settled pipeline section and a settlement value of the settled pipeline section;

(2) drilling a plurality of holes for containing bags, at a bottom part of the settled pipeline section which needs to be uplifted, along a radial direction of a settling end of the settled pipeline section;

(3) placing first grouting pipes respectively at an opening of each of the bags; fixing the opening of each bag on the respective first grouting pipe by a circular hoop; and placing each of the bags which is tied up into each of the holes;

(4) injecting the polymer material, which is a two-component expansive polymer material, successively into each of the bags by the respective first grouting pipes;

(5) rapidly expanding and solidifying in the bags, by the polymer material, so as to generate a huge expansive force to uplift the settled pipeline section;

(6) drilling a plurality of grouting holes at middle positions between each two holes, wherein each grouting hole has a diameter of 1.6 cm and is so deep as to penetrate a wall of the settled pipeline section; and inserting second grouting pipes respectively into the grouting holes; and (7) injecting the polymer material to the cavity outside the pipeline by the second grouting pipes; rapidly expanding and solidifying after reacting, by the polymer material, so as to fill the cavity caused by uplifting the settled pipeline section and effectively reinforce the soft soil layer surrounding the settled pipeline section.

2. The polymer bag grouting method for repairing the settlement of the underground pipelines, as recited in claim 1, wherein the holes are drilled at a regular interval of 0.3-0.4 m; each hole has a diameter of 5-12 cm and a depth of 20-40 cm.

3. The polymer bag grouting method for repairing the settlement of the underground pipelines, as recited in claim 1, wherein a length of each bag is larger than a depth of the hole; each bag has the length of 30-60 cm and a diameter of 10-40 cm.

4. The polymer bag grouting method for repairing the settlement of the underground pipelines, as recited in claim 1, wherein the polymer material is a non-water reacted two-component polymer material.

5. The polymer bag grouting method for repairing the settlement of the underground pipelines, as recited in claim 2, wherein the polymer material is a non-water reacted two-component polymer material.

6. The polymer bag grouting method for repairing the settlement of the underground pipelines, as recited in claim 3, wherein the polymer material is a non-water reacted two-component polymer material.

* * * * *